No. 761,481. Patented May 31, 1904.

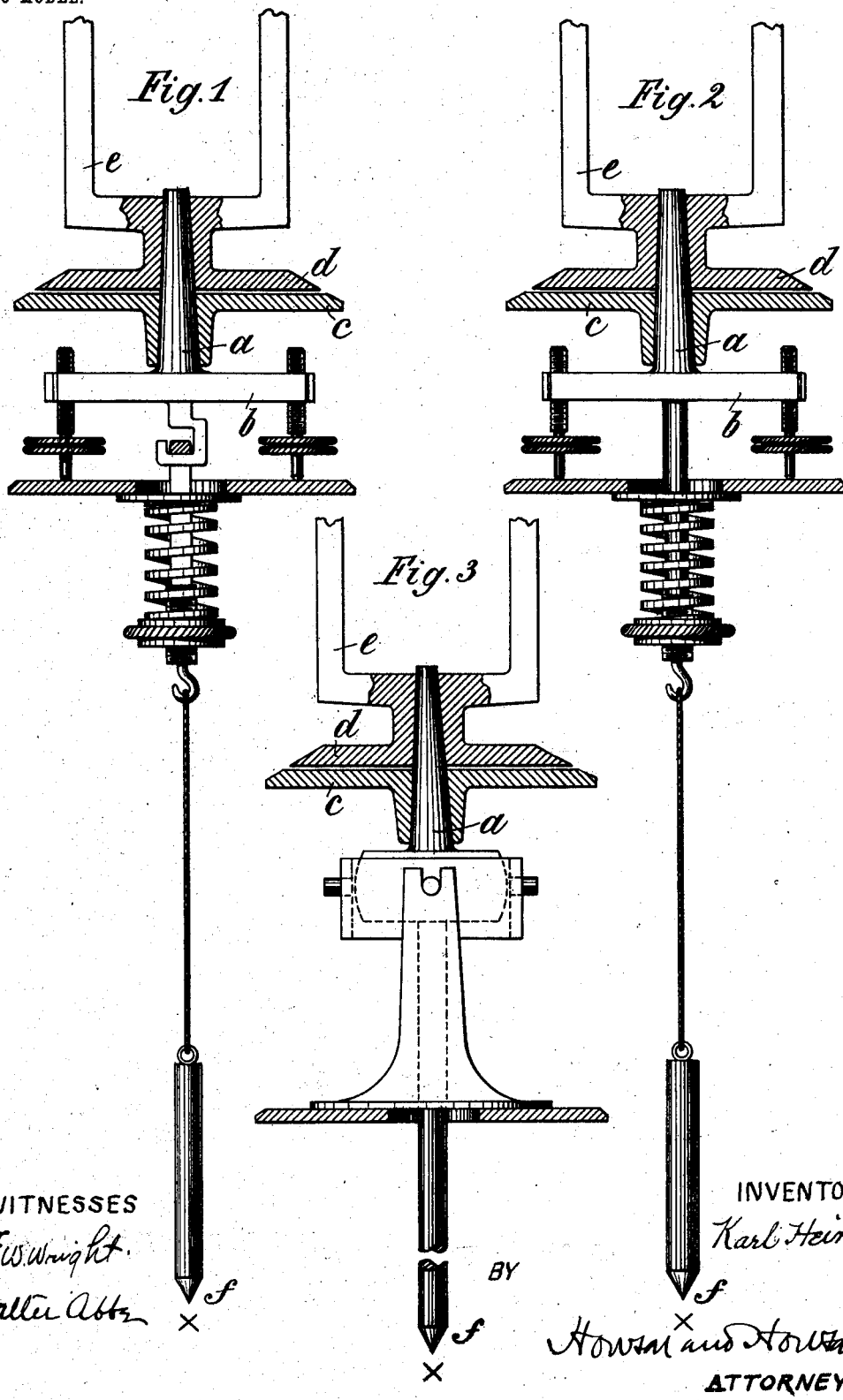

UNITED STATES PATENT OFFICE.

KARL HEIN, OF HANOVER, GERMANY.

GEODETIC INSTRUMENT.

SPECIFICATION forming part of Letters Patent No. 761,481, dated May 31, 1904.

Application filed March 7, 1903. Serial No. 146,677. (No model.)

*To all whom it may concern:*

Be it known that I, KARL HEIN, a subject of the Emperor of Germany, residing in Hanover, Germany, have invented an Improved Geodetic Instrument, of which the following is a specification.

The invention relates to geodetic instruments, such as a theodolite, and has for its object to improve the mounting and centering of the various parts which are adapted for rotatable motion one with the other.

In the accompanying drawings, Figure 1 is a vertical cross-section of one form of theodolite. Fig. 2 is a vertical cross-section showing the supporting-pin in one piece, and Fig. 3 is a similar view showing a cardanic support for the theodolite.

On the conical supporting-pin $a$ (which in Figs. 1 and 2 is shown connected with the plate $b$ of a tripod or other stand provided with adjusting-screws) the limbs $c$, the alidade $d$, and the telescope-supporter $e$ are set up one over the other.

Though I have shown and described but the rudimentary elements of a theodolite in this application, it will be understood that one skilled in the art may supply or attach to the various supports shown any known form of vernier, compass, nonius for the horizontal-circle limbus, or like elements.

In the instruments hitherto used—for instance, in simple theodolites, the vertical alidade-axis, and in repetition-theodolites—both the vertical alidade-axis and the vertical limb-axis were set into the vertical case of the tripod, while onto the tripod-case or onto a hook under the same the plummet $f$ was hung, as in Fig. 1, by means of which the vertical axis of the instrument was to be exactly centered over the nadir-point; but one can never be certain that this second vertical axis really forms a straight continuation of the first and that there is not an invisible deflection. This fault is done away with by placing the vertical supporting-pin $a$ as shown in Figs. 2 and 3, making it as long as desired and carrying it downward through the plate $c$. The supporting-pin $a$ as it is so carried downward and as it also carries the instrument-supports, which are fixed centrically and rotatably one over the other, points exactly to the nadir-point $f$ when the instrument-supports are in horizontal position or, with a sufficiently long supporting-rod strikes exactly the nadir-point over which the instrument-supports revolve.

The exact centering, which may be effected in the before-described manner, may, however, be essentially impaired by certain faults which are connected with the construction of the tripod and adjusting-screws hitherto used. The most exact centering can be effected with absolute certainty, even with an obliquely-placed tripod, if the uninterrupted supporting-pin or supporting-rod, carried through downward, moves in a joint after the manner of the cardanic suspension, Fig. 3.

The continuous supporting-pin or supporting-rod $a$ may also consist of several pieces, which are put together before use. This is necessary if the apparatus must be used not only on a tripod but on a column.

I claim as my invention—

1. A geodetic instrument, having a number of instrument-supports, one mounted above and free of the other on a common axis, and each independently rotatable on the common axis, substantially as described.

2. A geodetic instrument, having a number of instrument-supports, one mounted above and free of the other on a common axial pin, and each independently rotatable on the common axis, and a support for the axial pin, a continuation of the pin passing through and below said pin-support, substantially as described.

3. A geodetic instrument, having a pin, a support therefor, a limb and an alidade, each mounted on the pin, one above and free of the other, and each adapted to revolve on said pin independently, substantially as described.

4. A geodetic instrument, having a conical pin, a support therefor, an alidade to fit one portion of the conical pin, and rotatably mounted thereon, and a limb mounted on the pin, free of the alidade, substantially as described.

5. A geodetic instrument, having an upwardly-extending pin, a cardanic support therefor, a continuation of said pin depending downward for a plummet and an alidade and limb mounted on said pin one above and free of the other, substantially as described.

6. A geodetic instrument, having a conical pin, a limb fitting rotatably on a portion of the pin, and an alidade fitting the pin above it, and free of the limb, a cardanic support for the pin, alidade and limb and a continuation to the pin depending below the support for the plummet, substantially as described.

In testimony whereof I have signed my name to this specification in the presence of two subscribing witnesses.

KARL HEIN.

Witnesses:
 VICTOR HEIN,
 LEONORE RESCH.